(12) United States Patent
Aubouy et al.

(10) Patent No.: US 8,657,397 B2
(45) Date of Patent: Feb. 25, 2014

(54) PORTABLE DEVICE AND METHOD FOR PRINTING AN IMAGE, RECORDING MEDIUM, PEN AND BENCHMARK FOR SAID DEVICE

(75) Inventors: Miguel Aubouy, Grenoble (FR); Viviane Cattin, Saint Egreve (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 60 days.

(21) Appl. No.: 13/509,670

(22) PCT Filed: Nov. 10, 2010

(86) PCT No.: PCT/EP2010/067218
§ 371 (c)(1),
(2), (4) Date: Jun. 19, 2012

(87) PCT Pub. No.: WO2011/058061
PCT Pub. Date: May 19, 2011

(65) Prior Publication Data
US 2012/0249634 A1    Oct. 4, 2012

(30) Foreign Application Priority Data

Nov. 12, 2009  (FR) ................................ 09 57976

(51) Int. Cl.
| B41J 29/38 | (2006.01) |
| G06F 3/033 | (2013.01) |
| B43K 29/00 | (2006.01) |
| C23C 16/52 | (2006.01) |

(52) U.S. Cl.
USPC .................... 347/9; 345/179; 401/195; 427/8

(58) Field of Classification Search
USPC .................... 347/9; 345/179; 401/195; 427/8
See application file for complete search history.

(56) References Cited

U.S. PATENT DOCUMENTS

| 5,861,877 | A  |   | 1/1999  | Kagayama et al. |
| 6,335,727 | B1 | * | 1/2002  | Morishita et al. ............. 345/179 |
| 6,454,482 | B1 | * | 9/2002  | Silverbrook et al. ......... 401/195 |
| 6,808,330 | B1 |   | 10/2004 | Lapstun et al. |
| 6,957,923 | B2 |   | 10/2005 | Lapstun et al. |
| 2005/0100680 | A1 | | 5/2005 | Bustgens |
| 2007/0140776 | A1 | | 6/2007 | Lapstun et al. |
| 2009/0022879 | A1 | | 1/2009 | Bustgens et al. |

FOREIGN PATENT DOCUMENTS

| DE | 2005003333 | A1 | 7/2006 |
| EP | 1502544    | A1 | 2/2005 |
| FR | 953462     |    | 12/1949 |
| WO | 2001/30589 | A1 | 5/2001 |
| WO | 03/066239  |    | 8/2003 |
| WO | 2004/015980 | A2 | 2/2004 |

* cited by examiner

Primary Examiner — Jannelle M Lebron
(74) Attorney, Agent, or Firm — Occhiuti & Rohlicek LLP

(57) ABSTRACT

The invention relates to a portable device for printing an image in a printing area provided on a material substrate, which includes: at least one removable benchmark (96-99) capable of being manually positioned on the substrate and associated with a corresponding point of the image being printed by means of a predefined relationship separate from the position of said benchmark on the substrate, a measurement unit capable of measuring the position of the printing head relative to the benchmark, and a control unit (14) capable of determining the distance separating the pen from the substrate, from the measurement of the position of the printing head, and of preventing the image from being printed on the substrate if said distance is greater than a predetermined threshold.

Figure 1:
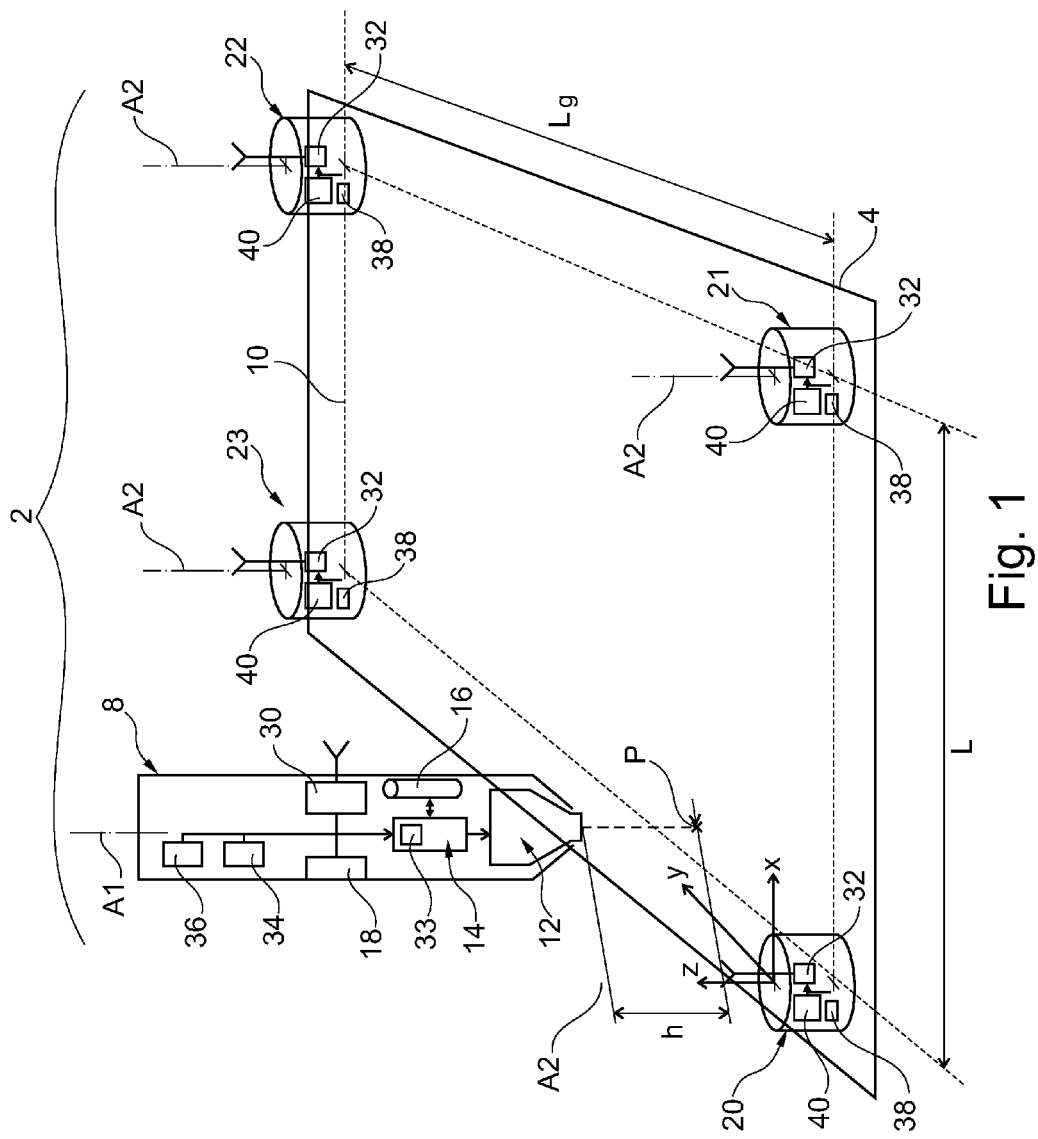

13 Claims, 3 Drawing Sheets

PORTABLE DEVICE AND METHOD FOR PRINTING AN IMAGE, RECORDING MEDIUM, PEN AND BENCHMARK FOR SAID DEVICE

CROSS-REFERENCE TO RELATED APPLICATIONS

This application is the National Stage of International Application No. PCT/EP2010/067218, filed on Nov. 10, 2010, which claims the benefit of the priority date of French Application No. 0957976, filed on Nov. 12, 2009. The content of these applications is hereby incorporated by reference in its entirety.

The invention relates to a portable device and a method for printing an image in a print area provided on a material substrate. The invention further relates to a data recording medium, a pen and a benchmark for implementing said printing method.

The invention relates in particular to "contactless" printing devices, that is to say, devices in which the printing head is not in direct physical contact with the substrate upon which the print is made.

Printing Devices Comprise:
  at least one pen equipped with a printing head that is manually positionable in the print area,
  a measurement unit for measuring the position of the printing head,
  a control unit for controlling the printing head and suitable for controlling the printing of a predefined image point on the substrate.

For example, such a device is disclosed in patent application U.S. Pat. No. 5,861,877. In said first known device, the position of the pen is measured using an accelerometer or a similar position sensor. The position of the pen is therefore measured relative to its starting point.

For the image to be correctly printed, this implies that the starting point of the pen is correctly positioned relative to the substrate upon which the image is to be printed. This operation may prove to be tedious to perform manually.

Furthermore, once the printing process has begun, it must be continued to completion. This is because if the pen is withdrawn from the substrate while the printing of the image has not been completed, said printing can only be resumed by positioning the pen very accurately at the same starting point as the one previously used. It is not possible to resume the printing of the image at any point of the print area.

In parallel with said first device, patent application U.S. Pat. No. 6,808,330 has already proposed a second printing device in which the position of the pen is measured by incorporating position labels inside the substrate. When the pen passes above one of these labels, it reads it to determine its position relative to the substrate. However, said second device cannot be used to print an image on any substrate that is devoid of position labels.

Other printing devices, like those described in patent applications DE10 2005 003 333 or WO2004/015980, use markers to detect the position of the pen. However, these devices do not allow truly "contactless" printing on the substrate. For example, they cannot be used to print an image on a flexible or fragile substrate which may be deformed or torn by simple physical contact with part of the pen. Furthermore, nothing is provided in these devices to avoid incorrect printing distances.

It is an object of the invention to remedy at least one of these drawbacks.

It therefore relates to a portable printing device in which:
  the device comprises at least one removable benchmark manually positionable on the substrate and associated with a corresponding point of the image to be printed by a predefined relationship independent of the position of said benchmark on the substrate,
  the measurement unit is suitable for measuring the position of the printing head relative to the benchmark, and
  the control unit is suitable for determining the image point to be printed according to:
    the real measured position of the printing head relative to the benchmark, and
    the predefined relationship that associates an image point with said benchmark, and
  the control unit is suitable for determining the distance between the pen and the substrate from the measurement of the position of the printing head and for preventing the printing of the image on the substrate if said distance is greater than a predefined threshold.

The positioning of at least one benchmark on the substrate and the measurement of the position of the pen relative to said benchmark serves to locate the pen in a reference frame integral with said benchmark. The measured position is therefore independent of the starting point of the pen. In the above device, it is therefore unnecessary to position the pen on a precise starting point. It is also possible to resume the printing process at any point of the print area when the printing has been interrupted.

The benchmark is mechanically independent of the substrate. The above device therefore allows printing on any substrate.

Finally, incorrect prints associated with an excessive distance between the pen and the substrate are avoided.

The embodiments of the above printing device may comprise one or more of the following features:
  the measurement unit is also suitable for measuring the orientation of the printing head relative to the benchmark and the control unit is also suitable for controlling the printing head according to said measured orientation;
  the device comprises:
    at least two benchmarks,
    the measurement unit is suitable for measuring the distance between said two benchmarks, and
    the control unit is suitable for determining the image points to be printed also according to the distance measured between said two benchmarks, in order to stretch or shrink the image in proportion to said distance;
  the device comprises at least one relay marker manually positionable independently of the benchmark, said relay marker not being associated with an image point by a predefined relationship independent of its position relative to the substrate, and the measurement unit also comprises:
    a sensor for detecting the position of the pen in a reference frame integral said relay marker,
    a sensor for detecting the position of the relay marker relative to the benchmark, and
    a converter for converting the measured position of the pen, expressed in the reference frame integral with the relay marker, to a position relative to the benchmark;
  the measurement unit comprises:
    at least one magnetic field sensor and at least one magnetic field source, either the magnetic field sensor or source being lodged in the pen while the other is lodged in the benchmark or the relay marker, and a determinator for determining the position of the printing head relative to the benchmark or relay marker from measurements, taken by the sensor, of the magnetic field radiated by the magnetic field source;

the magnetic field sensor is a triaxial magnetic field sensor and the magnetic field source is a triaxial magnetic field source;

the measurement unit comprises:
at least one transmitter and one receiver of a wave suitable for propagating between the pen and the benchmark or relay marker, either said transmitter or said receiver being lodged in the pen while the other is lodged in the benchmark or relay marker, and a determinator for determining the position of the printing head relative to the benchmark or relay marker from the wave propagation time between the transmitter and the receiver.

These embodiments of the device further have the following advantages:

the consideration of the orientation of the printing head relative to the benchmark during the printing serves to improve the print quality, the use of at least two benchmarks and the measurement of the distance between said two benchmarks serves to stretch or shrink the printed image in proportion to said measured distance, the use of a relay marker serves to increase the dimensions of the print area without increasing the power of the signals used to measure the position of the pen, the use of a magnetic field sensor and a magnetic field source serves to accurately measure the position of the pen relative to the benchmark, the use of a triaxial magnetic field sensor and source makes it possible, using the same sensor and the same source at the same time, to measure the position and orientation of the pen relative to the benchmark, the use of a transmitter and a receiver serves to measure the position of the pen from the propagation time of a wave and therefore to obtain an accurate measurement.

The invention also relates to a method for printing an image in a print area provided on a material substrate using a printing head lodged in a pen that is manually positionable in the print area for printing a predefined image point on the substrate and in which the method comprises:

the manual positioning of at least one removable benchmark on the substrate, said benchmark being associated with a corresponding point of the image to be printed by a predefined relationship independent of the position of said benchmark on the substrate, the measurement of the position of the printing head relative to the benchmark, the determination of the image point to be printed according to:
the real measured position of the printing head relative to the benchmark, and
the predefined relationship which associates an image point with said benchmark, the control of the printing head to print the predefined image point on the substrate, and the determination of the distance between the pen and the substrate from the measurement of the position of the printing head, and the prevention of the printing of the image on the substrate if said distance is greater than a predefined threshold.

The embodiments of this printing process may comprise the following feature:

the method comprises the measurement of the orientation of the printing head relative to the substrate and the prevention of the printing of the image on the substrate if the measured orientation of the printing head relative to the benchmark is not included in an ink projection authorization cone defined by an apex angle and a predefined direction; and the method comprises the measurement of the orientation of the pen relative to the substrate and the adjustment of the quantity of ink projected on the substrate according to the measured orientation.

The invention also relates to a data recording medium comprising instructions for implementing the above printing method, when said instructions are executed by an electronic calculator.

The invention also relates to a pen for implementing the above printing device, said pen incorporating at least part of the elements of the measurement unit suitable for measuring the position of the printing head relative to the benchmark, and a control unit suitable for determining the distance between the pen and the substrate from the measurement of the position of the printing head and for preventing the printing of the image on the substrate if said distance is greater than a predefined threshold.

Finally, the invention also relates to a control unit for implementing the above device in which said control unit is programmed for determining the distance between the pen and the substrate from the measurement of the position of the printing head and for preventing the printing of the image on the substrate if said distance is greater than a predefined threshold.

Figure 2:
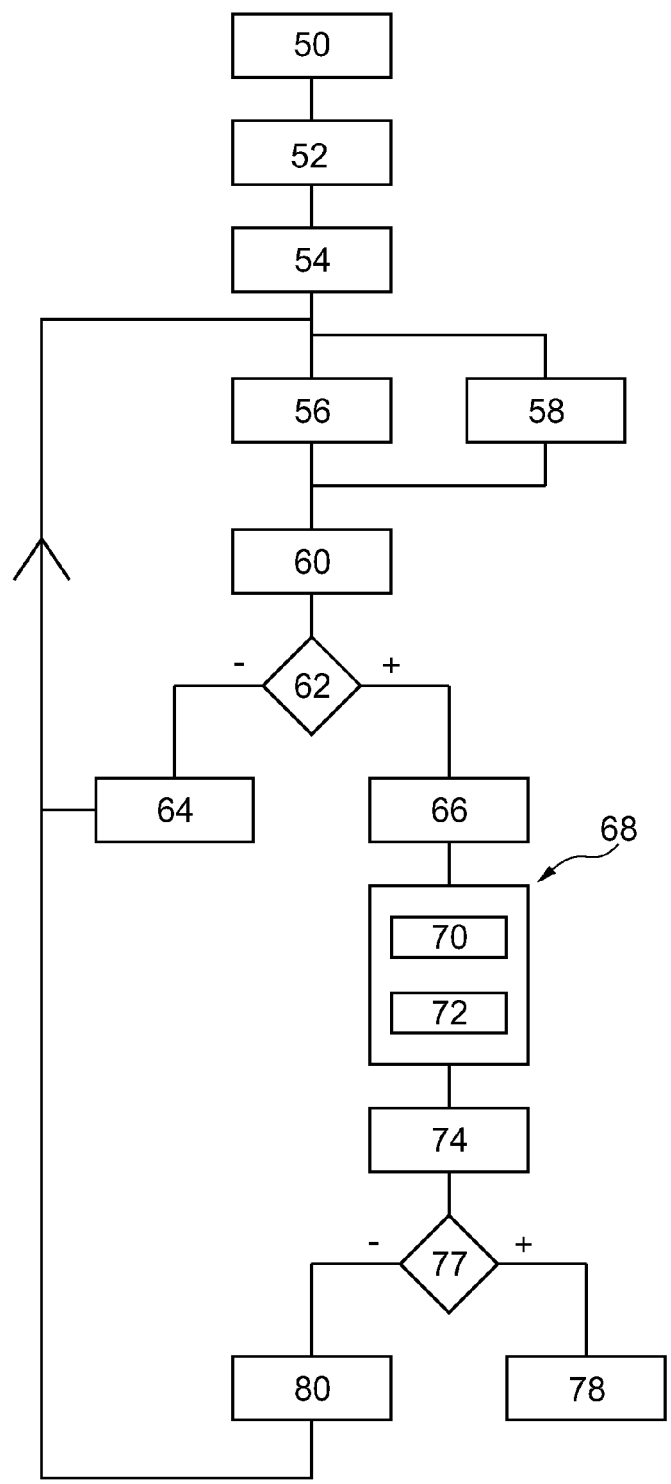
Figure 3:
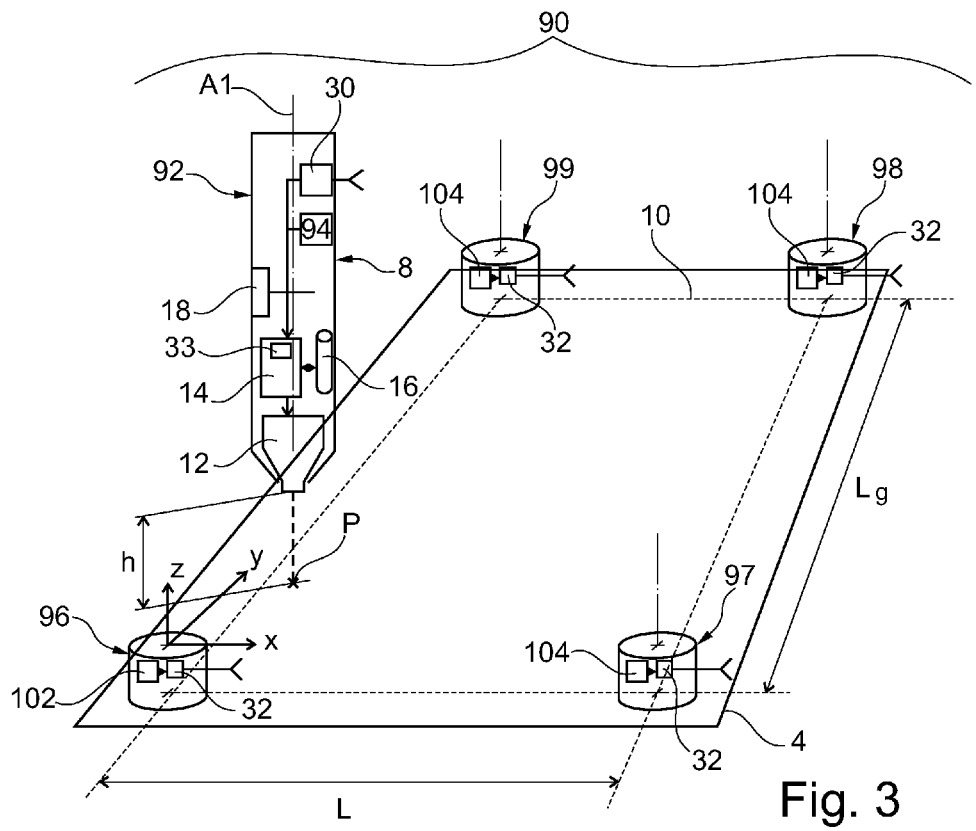
Figure 4:
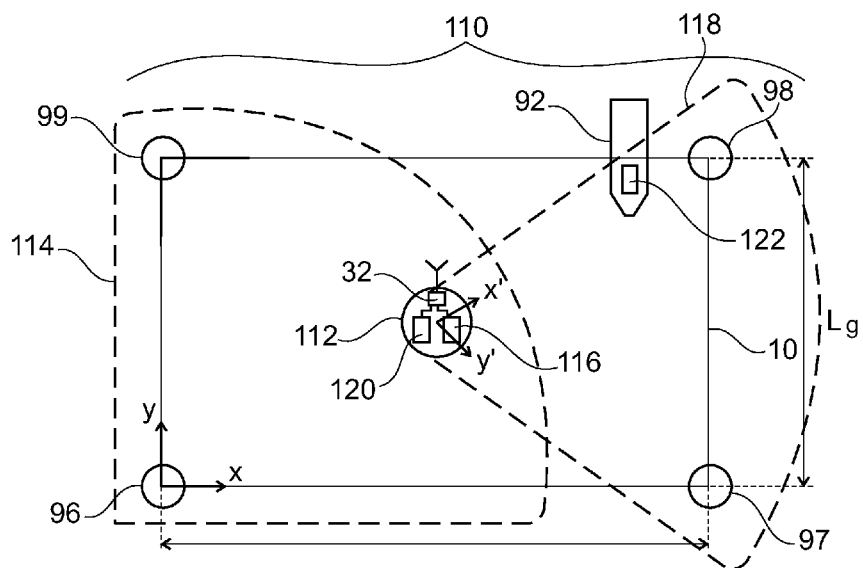

The invention will be better understood from a reading of the description that follows, provided exclusively as a non-limiting example and with reference to the drawings in which:

FIG. 1 is a schematic perspective view of a first embodiment of a printing device, FIG. 2 is a flowchart of a printing method using the device in FIG. 1, FIG. 3 is a schematic perspective view of a second embodiment of a printing device, and FIG. 4 is a schematic plan view of a third embodiment of a portable printing device.

In these figures, the same reference numerals are used to denote the same elements.

In the rest of this description, the features and functions well known to a person skilled in the art are not described in detail.

FIG. 1 shows a device 2 for printing an image on a horizontal material substrate 4.

Here, image means any type of pattern which can be printed on the substrate 4. These patterns may be in black and white or in shades of gray or even in color with, if necessary, shades of color. These patterns may correspond to a photograph, a geometric pattern or others.

The substrate 4 has a flat and horizontal upper face. The substrate 4 is made from any type of material which can be printed. Here, the substrate 4 is made from a material which may be damaged if it comes into contact directly with a printing head. For example, it may be a flexible and fragile membrane such as human skin, a spider's web, a milk membrane, beer foam, etc.

The device 2 is portable, that is to say, it is directly transportable by a human being without the need for technical lifting means. For this purpose, the overall weight of the elements of the device 2 is typically less than 10 kg and, preferably, less than 5 or 1 kg. To facilitate transport, the overall volume of the elements of said device 2 is typically lower than 0.15 m³ and, preferably, lower than $10^{-3}$ or $10^{-4}$ m³.

The device 2 comprises a pen 8 that is manually positionable by an operator above a print area 10 provided on the upper face of the substrate 4 and inside which the image is to be printed. The pen 8 must be separated vertically from the substrate 4 by a height h greater than a nonzero threshold $S_3$ so as to avoid being in direct contact with the substrate.

The print area 10 is rectangular here with a width L and a length Lg.

The pen 8 extends essentially along a longitudinal axis A1. The dimensions of the pen 8 are provided so that it can be easily handled by the hand of the operator. For example, the length of the pen 8 is lower than 20 cm and its width is lower than 5 cm. The weight of the pen 8 is typically lower than 1 kg and, preferably, lower than 200 g.

The pen 8 comprises a printing head 12 grouping all the elements required for printing on said substrate 4. For example, the head 12 is an inkjet printing head equipped with:
  one or more reservoirs of ink to be projected on the substrate 4,
  at least one ink projecting nozzle, and
  at least one actuator to transfer the ink from the reservoir to the nozzle and project the ink on the substrate 4.

It is assumed here that each ink projecting nozzle extends essentially parallel to the axis A1.

The pen 8 also comprises:
a control unit 14 for controlling the printing head 12,
a memory 16 containing the image to be printed on the substrate 4,
an interface 18, and
a power source (not shown) required for its operation, such as a battery.

The unit 14 is connected to the memory 16. The image recorded in the memory 16 is coded, for example, in a standard format such as the "bitmap" format. Here, the image to be printed is a rectangular image.

The control unit 14 is produced from programmable electronic calculators suitable for executing instructions recorded on a data recording medium. For this purpose, the memory 16 comprises the instructions required for the execution of the method in FIG. 2, when they are executed by the unit 14.

The interface 18 serves to connect the pen 8 to a computer to record an image to be printed in the memory 16.

The device 2 also comprises removable benchmarks that are manually positionable on the substrate 4. For illustration, in this embodiment, the device comprises four benchmarks 20 to 23.

The benchmarks 20 to 23 are added onto the already existing substrate 4. They are therefore mechanically independent of the substrate 4 and can be freely positioned on the substrate 4 by the operator. Here, the benchmarks are deposited on said substrate 4 and are only held in place on the substrate 4 by gravity.

Each of these benchmarks is associated with a point of the image to be printed by a predefined relationship independent of the position of the benchmark on the substrate. This predefined relationship is for example recorded in the memory 16. Here, this predefined relationship indicates that each of the benchmarks 20 to 23 corresponds to an angle of the rectangular image to be printed. These benchmarks therefore delimit the print area 10.

The device 2 comprises a unit for measuring the position and orientation of the printing head 12 relative to the benchmarks 20 to 23. This unit measures the six degrees of freedom of the printing head. For this purpose, the position and orientation of the printing head are indicated, respectively, by two triplets of x, y, z and $\theta_x$, $\theta_y$, $\theta_z$ coordinates, expressed in an orthogonal XYZ reference frame fixed without any degree of freedom to the benchmark 20. Here, the X and Y directions of the XYZ reference frame are parallel to the upper face of the substrate 4 while the Z direction extends vertically. The angles $\theta_x$, $\theta_y$, and $\theta_z$ correspond to the angles made by the axis A1, with the X, Y and Z directions, respectively.

To determine the position of the printing head 12, in this embodiment, the pen 8 and the benchmarks 20 to 23 are equipped with electromagnetic wave transmitters/receivers 30 and 32, respectively. For example, the transmitters/receivers 30 and 32 are transmitters/receivers of Ultra Wide Band waves better known by the acronym UWB. Each of these transmitters/receivers is equipped with a timer for measuring the wave transmission and reception times in order to measure the wave propagation time between the transmitters/receivers 30 and 32.

The unit 14 is also equipped with a determinator 33 for determining the distance between the pen 8 and each of the benchmarks 20 to 23 from the measured propagation times.

The orientation of the printing head is shown here by the orientation of the axis A1 that is integral with the printing head. Hence, the measurement of the orientation of the printing head 12 consists in measuring the angles $\theta_x$, $\theta_y$ and $\theta_z$. For this purpose, the measurement unit also comprises:
  an accelerometer 34 and a magnetometer 36 fixed without any degree of freedom to the pen 8, and
  accelerometers 38 and magnetometers 40 fixed without any degree of freedom to each of the benchmarks 20 to 23.

For example, the accelerometer 34 and the magnetometer 36 are lodged inside the pen 8 An accelerometer 38 and a magnetometer 40 are lodged inside each of the benchmarks 20 to 23.

The accelerometer 34 measures the angle made by the axis A1 with the vertical direction shown by the local direction of the earth's gravitational field. The magnetometer 36 measures the angle made by the axis A1 with the magnetic north of the earth's magnetic field.

Preferably, the accelerometer 34 and the magnetometer 36 are placed in the part of the pen 8 furthest from the printing head 12 in order to increase the accuracy of the orientation measurement of the axis A1.

The accelerometer 38 measures the angle made by an axis A2 integral with the benchmark with the vertical. The magnetometer 40 measures the angle made by said axis A2 with magnetic north.

The orientation of the axis A2 must be representative of the orientation of the upper face of the substrate 4. For this purpose, here, each benchmark is conformed so that when it is deposited on the substrate 4, the axis A2 is systematically perpendicular to the upper face of the substrate 4. For example, each of the benchmarks comprises at least one flat face perpendicular to the axis A2 and intended to bear directly on the upper face of the substrate 4. Preferably, each benchmark comprises no more than two of these flat faces, the other faces of the benchmark being concave. Here, each benchmark has the shape of a cylinder whereof the axis of revolution is the axis A2.

The operation of the device 2 will now be described in greater detail with regard to the method of FIG. 2.

Preferably, initially, in a step 50, the image to be printed is recorded in the memory 16. For example, for this purpose, the pen 8 is connected to a computer via the interface 18.

Then, in a step 52, the benchmarks 20 to 23 are manually deposited on the substrate 4. Here, they are positioned so as to delimit the angles of the print area 10.

In a step 54, the pen 8 is energized then brought toward the print area 10.

Then, in a step 56, the position of the printing head 12 relative to the benchmarks 20 to 23 is measured. For this purpose, the determinator 33 measures the propagation times of the electromagnetic wave transmitted by the transmitter/receiver 30 to the benchmarks 20 to 23. These propagation times are then used by the unit 14 to determine the distance from the printing head 12 to each of the benchmarks 20 to 23. Similarly, in the step 56, the distances of the benchmarks 20 to 23 from one another are measured. Based on these various propagation times, the unit 14 determines the x, y and z coordinates of the printing head 12 in the XYZ reference frame, for example by triangulation.

In parallel, in a step 58, the orientation of the axis A1 relative to the X, Y and Z directions is also measured. For this purpose, the accelerometer 34 and the magnetometer 36 measure the orientation of the axis A1 relative to the vertical and to magnetic north, respectively. At the same time, the accelerometers 38 and the magnetometers 40 of each of the benchmarks 20 to 23 measure the orientation of the axis A2 relative to the vertical and to magnetic north, respectively. These measurements are then transmitted to the unit 14 which combines them to obtain the $\theta_x$, $\theta_y$ and $\theta_z$ angular coordinates of the axis A1 in the XYZ reference frame.

Based on the position and the measured orientation of the pen 8, in a step 60, the unit 14 determines the vertical distance h (FIG. 1) from the printing head 12 to the substrate 4 and the value of the angle $\theta_z$, between the axis A1 and the vertical direction Z.

In a step 62, the unit 14 checks whether the pen is located inside an ink projection authorization cone substantially perpendicular to the plane of the substrate 4. For example, for this purpose, the distance h and the absolute value of the angle $\theta_z$ are compared with predefined thresholds $S_1$ and $S_2$, respectively. If the distance h is higher than the threshold $S_1$ or if the absolute value of the angle $\theta_z$ is higher than the threshold $S_2$ then, in a step 64, the projection of ink by the printing head 12 on the substrate 4 is automatically prevented. Thus, the thresholds $S_1$ and $S_2$ define the ink projection authorization cone. When the pen is not inside this cone, that is to say, it is too far from the substrate 4 or too inclined to said substrate, the printing must be prevented because it cannot be performed correctly.

In the opposite case, the method continues with a step 66 during which the coordinates of a point P (FIG. 1) of ink deposition on the substrate 4 are calculated. The point P is the location of the print area 10 where the ink projected by the printing head 12 is deposited. The coordinates of the point P are obtained from the measured x, y, z and $\theta_x$, $\theta_y$, $\theta_z$ coordinates of the printing head. For example, the coordinates of the point P are obtained by calculating the coordinates of the point of intersection between the trajectory of the ink projected by the printing head and the print area 10.

Then, in a step 68, the unit 14 identifies the point of the image recorded in the memory 16 associated with the point P. For this purpose, the predefined relationship relating each benchmark to an image point is used.

For example, if this has not already been done, during an operation 70, the unit 14 calculates the size of the print area 10 from the position of the various benchmarks 20 to 23 relative to the pen 8. Then, during this operation 70, the unit 14 calculates a stretch factor which can be used to convert the coordinates of the point P expressed in the XYZ reference frame to coordinates corresponding to a pixel of the image to be printed. For example, two stretch factors $C_x$ and $C_y$ along the X and Y directions, respectively, are calculated using the following equations:

$$C_x = (L_{img}/L)$$

$$C_y = (L_{gimg}/Lg)$$

where $L_{img}$ and $L_{gimg}$ are the width and length of the image to be printed, respectively.

The spacing between the benchmarks therefore determines the dimensions of the image to be printed. In other words, the wider the space between the benchmarks, the larger the image to be printed. Conversely, the closer the benchmarks to one another, the smaller the image to be printed. Here, in all cases, the image to be printed occupies the entire print area.

In this particular case, since the print area and the image to be printed are rectangular, the stretch factors $C_x$ and $C_y$ are constant regardless of the x, y coordinates of the point P.

However, if the print area and the image to be printed do not have the same shape (for example, the delimited print area is trapezoidal and the image to be printed is rectangular), then the stretch factors $C_x$ and $C_y$ vary according to the x, y coordinates of the point P, so that the image always completely fills the print area.

Once the stretch factors $C_x$, $C_y$ have been determined, during an operation 72, they are used to obtain the coordinates of the pixel to be printed from the x and y coordinates of the deposition point. For example, the x and y coordinates are simply multiplied, by the stretch factors $C_x$ and $C_y$ respectively.

Once the pixel to be printed has been identified, during a step 74, the unit 14 commands the printing head to print the pixel identified in step 68. During this step, preferably, the quantity of ink projected on the substrate is adjusted according to the measured orientation of the pen 8.

Then, during a step 77, the coordinates of the printed pixel are memorized, for example in the memory 16, and the unit 14 then checks whether all the image pixels have or have not already been printed.

If all the pixels have already been printed, this is followed by a step 78 during which the printing process is automatically stopped. The pen is then turned off and the benchmarks 20 to 23 are withdrawn from the substrate 4. The printing of the image on the substrate 4 is terminated.

In the opposite case, during a step 80, the operator manually moves the pen 8 toward locations of the print area 10 where the printing has not yet been done. On completion of this step 80, the steps 56 to 80 are reiterated as long as all the pixels of the image to be printed have not been printed on the substrate 4.

FIG. 3 shows a printing device 90 identical to the device 2, except that the unit for measuring the position and orientation of the printing head 12 is different. More specifically, the measurement unit is produced this time using at least one triaxial magnetic source and at least one triaxial magnetic field sensor.

"Triaxial magnetic field source" means a magnetic field source that is capable of transmitting magnetic fields in at least three different non-colinear directions. Typically, these transmission directions are orthogonal to one another. For example, such a triaxial source is produced using three coils each wound around three mutually perpendicular winding axes. For example, the turns of each coil are substantially equally distributed on either side of a point O of intersection between the three winding axes. Such a triaxial magnetic field source can be modeled in a far field as three magnetic point dipoles centered at the point O. One is considered to be in the far field when the distance from the point O is at least three to four times the largest dimension of the triaxial source. The largest dimension of the triaxial source is, for example, equal to the largest length of the coils. The triaxial source transmits a magnetic field either simultaneously along each of the transmission axes or sequentially over time.

"Triaxial magnetic field sensor" means a sensor capable of measuring the projection of the magnetic field on at least three measurement axes which are not mutually colinear. Typically, these measurement axes are orthogonal to one another. Such a triaxial sensor is, for example, produced in a similar manner to the triaxial source, except that the coils are used to measure the projection of the magnetic field and not to transmit a magnetic field.

In the embodiment of FIG. 3, the pen 8 is replaced by a pen 92 identical to the pen 8. However, the accelerometer 34 and the magnetometer 36 are replaced by a triaxial magnetic field sensor 94. This sensor 94 is joined to the pen 92 and, for example, lodged inside said pen.

The benchmarks 20 to 23 are replaced by benchmarks 96 to 99 which are identical to the benchmarks 20 to 23 except that the accelerometers 38 and magnetometers 40 are replaced, in the benchmark 96, by a triaxial magnetic field source 102 and in the benchmarks 97 to 99 by a triaxial magnetic field sensor 104.

The transmitters/receivers 30 and 32 are maintained to allow the exchange of data between the pen and the benchmarks 96 to 99. These data exchanges are used, for example, to time-synchronize the source 102 and the sensors 94 and 104.

The determinator 33 determines the position and orientation of the printing head 12 in the XYZ reference frame that is fixed without any degree of freedom to the benchmark 96 by resolving a system of equations. This system of equations is obtained by modeling the magnetic interactions between the triaxial source 102 and the triaxial sensor 94. In this system of equations, the x, y and z and $\theta_x$, $\theta_y$, and $\theta_z$ coordinates of the printing head are the unknowns. More data about such systems of equations may, for example, be found in patent application EP 1 502 544. Reference can also be made to patent application FR 09 53 462.

The operation of the device 90 is identical to that described with regard to FIG. 2 except that the position and orientation of the printing head are measured differently.

FIG. 4 shows a printing device 110 which is, for example, identical to the device 90 with the exception that it comprises at least one relay marker. To simplify FIG. 4, only one relay marker 112 has been shown.

The relay marker 112 serves to increase the dimensions of the print area 10 without necessarily increasing the power of the signals used to measure the position and orientation of the printing head. More specifically, in this embodiment, the useful range of the magnetic field transmitted by the source 102 incorporated in the benchmark 96 is represented by a coverage area 114. It is assumed here that said coverage area 114 is not sufficiently extensive to include the benchmarks 97 and 98.

The relay marker 112 comprises the transmitter/receiver 32 to exchange data with the other benchmarks and the pen 92. This relay marker 112 also comprises a triaxial magnetic field source, which is, for example, identical to the source 102. The useful range of this source 116 is represented by a coverage area 118. The relay marker 112 is placed inside the coverage area 114 so that its own coverage area 118 is sufficiently extensive to include the benchmarks 97 and 98. Furthermore, here, the pen 92 is located in the coverage area 118 and not in the coverage area 114.

Finally, the relay marker 112 comprises a triaxial sensor 120, for example identical to the sensor 104.

A coordinate converter 122 is also installed in the pen 92.

Since the benchmarks 97 and 98 and the pen 92 are exclusively in the coverage area 118, the position and orientation of these benchmarks 97 and 98 and of the pen 92 are expressed in an X'Y'Z' reference frame that is fixed without any degree of freedom to the relay marker 112 (only the X' and Y' directions are shown in FIG. 4). However, since the relay marker 112 comprises the sensor 120, the position and orientation of said relay marker 112 relative to the benchmark 96 are measured, From these measurements, the converter 122 converts the x', y', z' coordinates of the pen 92 expressed in the X'Y'Z' reference frame to x, y, z coordinates expressed in the XYZ reference frame because the position and orientation of the relay marker 112 in said XYZ reference frame are known. From this time on, the operation of the device 10 is identical to that of the device 90.

Numerous other embodiments are feasible. In particular, other types of printing than inkjet printing are feasible. For example, the printing head can be replaced by another printing head capable of making a print by thermal transfer, by electrophotography, or another method.

The substrate may have any shape, any inclination to the vertical, and any size or type of substrate material. For example, the substrate may be a sheet of paper, a glass plate, a wall, a ceiling, a lining, etc. Only the ink is optionally adapted to the type of substrate material. When the substrate is inclined to the vertical, preferably, the benchmarks are equipped with means for attaching them to the substrate 4. For example, the flat face of these benchmarks intended to be in contact with the substrate is covered with an adhesive for bonding and then manually unbending these benchmarks to or from the substrate.

If the print area is larger than the range of the signals required to measure the position and orientation of the printing head, rather than using relay markers, the benchmarks can be replaced by benchmarks capable of transmitting signals of greater power and range.

The number of benchmarks may be higher than four. For example, more than four benchmarks simply serve to delimit print areas having more than four angles, such as a pentagonal print area, for example.

The number of benchmarks may also be lower than four and, in a simplified case, a single benchmark is necessary. For example, in the embodiment of FIG. 3, the benchmarks 97 to 99 of the device 90 are omitted. However, in this latter case, the stretch factors are no longer a function of the distance between two benchmarks. The dimensions of the print area are therefore constant or systematically assumed to be equal to the dimensions of the image or only determined from the dimensions of the image.

Alternatively, the predefined relationship associating a benchmark with an image pixel is prerecorded only for one or more first benchmarks, and is not prerecorded for one or more second benchmarks. For example, let us assume that there is only one first benchmark. Then, the predefined relationship is determined for the second benchmarks by calculation. For example, the predefined relationship is determined for the second benchmarks as a function of the measurements of their position relative to the first benchmark and from the predefined relationship associating said first benchmark with a pixel of the image.

The substrate 4 has been described in the particular case in which the face to be printed is planar. However, alternatively, this face is not necessarily planar. For example, it may be hemispherical or have other bosses. Based on prior knowledge of the shape of the substrate between the various benchmarks, and from the measurements of the position and orientation of the pen relative to said benchmarks, the distance from the pen to the substrate and its orientation relative to said substrate can be determined.

The benchmarks do not necessarily correspond to an angle of the image. For example, alternatively, each benchmark is associated with a predefined point of the image other than an angle of said image. In particular, one benchmark may be associated with the center of the image while another benchmark is associated with a midpoint of the upper edge of the image.

The distribution of the various elements described with regard to the preceding figures between, on the one hand, the pen and, on the other hand, the benchmarks can be modified. For example, alternatively, the control unit and the memory are lodged in a benchmark. In general, all the functions described here as being performed by elements of the pen may be distributed differently between the pen and the benchmarks.

The memory in which the image to be printed is recorded is also not necessarily in the pen or one of the benchmarks. It may, for example, be located in a computer capable of communicating with the pen 8 via the interface 18. In this case, the pen can retrieve the data on the image to be printed as required.

It is also possible for the magnetic source to be in the pen and not in the benchmark or for a plurality of magnetic sources to be used simultaneously, at least one of them in a benchmark and at least one of them in the pen.

Alternatively, the source 116 and the sensor 120 are produced from the same triaxial set of three coils whereof the winding axes are not colinear. In this case, the triaxial set is controlled either in source mode or in sensor mode. When the coils of the triaxial set are controlled in source mode, they are supplied to generate the magnetic fields. In source mode, the triaxial set is identical to one of the triaxial sources described above. In sensor mode, the coils are not energized. In consequence, the ambient magnetic flux passing through them gives rise to the presence of currents which constitute the measurement of the ambient magnetic field. In sensor mode, the triaxial set is identical to one of the triaxial sensors described above.

Other types of waves than ultra wide band waves can be used. For example, acoustic waves can be used.

The stretch factor can be determined exclusively from the distance between two benchmarks, for example. Typically, in this case, said benchmarks are used to mark the diagonal of the image to be printed and will preferably be located at the ends of said diagonal.

In another alternative, the calculation of the stretch factor is omitted. In this case, the size of the print area is constant or otherwise only determined from the dimensions of the image recorded in the memory 16.

Alternatively, only the position of the printing head is measured and not its orientation. In this case, since the number of unknowns is reduced, the number of axes of the sensors and sources can be reduced. For example, biaxial sensors or sources can be used instead of the triaxial sensors or sources. The number of axes used can also be reduced by decreasing the number of triaxial sensors or sources.

The orientation of the pen may also be represented by quaternion.

If each source continuously generates a periodic magnetic field with a specific frequency pattern, then a time-synchronization between the source 102 and the sensors 94 and 104 via the transmitters/receivers 30, 32 is unnecessary. Instead of this, a synchronous detection can be used.

The printing method can also be modified. For example, the interruption of the automatic printing can be omitted. In this case, the printing on the substrate 4 is stopped by the operator and not automatically.

The step 77 can be modified to allow the successive printing of a superimposition of a plurality of ink layers on the same point of the print area. For example, during the step 77, the printed pixel and the printed color are recorded after each printing on a point P of the substrate 4. Then, during a second passage of the pen 8 on said point P, the unit 14 automatically selects a second ink to be printed on said point P. The inks deposited between each passage of the pen on the same point may or may not be different. The inks deposited in successive layers on the same point may or may not be mixed. The printing does not stop until all the paint layers have been deposited on each point P of the print area.

The step 62 can be modified to implement other decision criteria concerning the opportunity to automatically prevent the printing. For example, in a simplified alternative, the comparison with the threshold $S_1$ or $S_2$ is omitted.

In another alternative, the printing is automatically prevented when the measured distance h is lower than the predefined threshold $S_3$. When the height h falls below said threshold S, an alarm, for example an acoustic signal, is automatically triggered to advise the user that the pen 8 is too close to the substrate 4 and therefore risks coming into contact with said substrate. The contact between the substrate 4 and the pen 8 may damage the substrate.

During the step 68, the control of the printing head may be a function of the orientation of the axis A1. For example, the flow rate of ink or the quantity of ink projected is adjusted according to the orientation of the axis A1 to the vertical. Conversely, the adjustment of the quantity of ink projected as a function of the measured orientation may be omitted.

In another alternative, the device 2 simultaneously comprises a plurality of pens used to print the same image simultaneously in the same print area. This then makes it possible for a plurality of operators to work on printing the same image at the same time in the same print area. For the various portions of the same image printed by each of the pens to be perfectly juxtaposed, it simply suffices for the position of each of said pens to be measured in the same reference frame associated with the benchmarks.

The features described in the dependent claims may be implemented independently of the features which allow the automatic prevention of the printing of the image. In particular, the use of a relay marker can be implemented without implementing the features to prevent the printing of the image if the pen is too far from the substrate or too inclined to said substrate.

The invention claimed is:

1. A portable device for printing an image in a print area provided on a material substrate, said device comprising at least one pen equipped with a printing head that is manually positionable in said print area, at least one removable benchmark manually positionable on said substrate and associated with a corresponding point of said image to be printed by a predefined relationship independent of a position of said benchmark on said substrate, a measurement unit for measuring a position of said printing head suitable for measuring the position of said printing head relative to said benchmark, a control unit for controlling said printing head and configured for controlling printing of a predefined image point on said substrate, said control unit being suitable for determining said image point to be printed according to a real measured position of said printing head relative to said benchmark, and a predefined relationship that associates said image point with said benchmark, wherein said control unit is configured for determining a distance between said pen and said substrate from said measurement of said position of said printing head and for preventing printing of said image on said substrate if said distance is greater than a predefined threshold.

2. The device of claim 1, wherein said measurement unit is also suitable for measuring orientation of said printing head relative to the benchmark and said control unit is also suitable for controlling said printing head according to said measured orientation.

3. The device of claim 1, further comprising at least two benchmarks, wherein said measurement unit is suitable for measuring a distance between said two benchmarks, and wherein said control unit is configured for determining the image points to be printed also according to the distance measured between said two benchmarks in order to stretch or shrink the image in proportion to said distance.

4. The device of claim 1, wherein said measurement unit comprises at least one transmitter and one receiver of a wave suitable for propagating between said pen and said benchmark or relay marker, either said transmitter or said receiver being lodged in said pen while the other is lodged in said benchmark or relay marker, and a determinator for determining the position of the printing head relative to the benchmark or relay marker from the wave propagation time between the transmitter and the receiver.

5. A pen for implementing the device of claim 1, said pen being equipped with a printing head that is manually positionable in the print area, wherein said pen incorporates at least part of elements of said measurement unit suitable for measuring the position of the printing head relative to the benchmark, said pen further comprising a control unit suitable for determining the distance between the pen and the substrate from the measurement of the position of the printing head and for preventing the printing of the image on the substrate if said distance is greater than a predefined threshold.

6. A control unit for implementing the device of claims 1, said control unit being programmed for determining the distance between the pen and the substrate from the measurement of the position of the printing head and for preventing the printing of the image on the substrate if said distance is greater than a predefined threshold.

7. The device of claim 1, further comprising at least one relay marker manually positionable independently of said benchmark, said relay marker not being associated with an image point by a predefined relationship independent of its position relative to the substrate, and wherein said measurement unit further comprises a sensor for detecting the position of said pen in a reference frame integral with said relay marker, a sensor for detecting the position of the relay marker relative to the benchmark, and a converter for converting the measured position of the pen, expressed in the reference frame integral with the relay marker, to a position relative to the benchmark.

8. The device of claim 7, wherein said measurement unit further comprises at least one magnetic field sensor and at least one magnetic field source, either the magnetic field sensor or source being lodged in said pen while the other is lodged in said benchmark or said relay marker, and a determinator for determining the position of the printing head relative to the benchmark or relay marker from measurements, taken by the sensor, of the magnetic field radiated by the magnetic field source.

9. The device of claim 8, wherein said magnetic field sensor is a triaxial magnetic field sensor and said magnetic field source is a triaxial magnetic field source.

10. A method for printing an image in a print area provided on a material substrate using a printing head lodged in a pen that is manually positionable in said print area for printing a predefined image point on said substrate, said method comprising manually positioning of at least one removable benchmark on said substrate, said benchmark being associated with a corresponding point of said image to be printed by a predefined relationship independent of position of said benchmark on said substrate, measuring the position of the printing head relative to the benchmark, determining the image point to be printed according to the real measured position of the printing head relative to the benchmark, and the predefined relationship that associates an image point with said benchmark, controlling the printing head to print the predefined image point on the substrate, determining the distance between the pen and the substrate from the measurement of the position of the printing head, and preventing the printing of the image on the substrate if said distance is greater than a predefined threshold.

11. The method of claim 10, further comprising measuring the orientation of the printing head relative to the substrate and preventing the printing of the image on the substrate if the measured orientation of the printing head relative to the benchmark is not included in an ink projection authorization cone defined by an apex angle and a predefined direction.

12. The method of 10, further comprising measuring the orientation of the pen relative to the substrate and adjusting the quantity of ink projected on the substrate according to the measured orientation.

13. A data recording medium having encoded thereon instructions for implementing the method of claim claim 10, when said instructions are implemented by an electronic calculator.

* * * * *

UNITED STATES PATENT AND TRADEMARK OFFICE
CERTIFICATE OF CORRECTION

| | | |
|---|---|---|
| PATENT NO. | : 8,657,397 B2 | Page 1 of 1 |
| APPLICATION NO. | : 13/509670 | |
| DATED | : February 25, 2014 | |
| INVENTOR(S) | : Miguel Aubouy et al. | |

It is certified that error appears in the above-identified patent and that said Letters Patent is hereby corrected as shown below:

In the Claims

In column 13, claim 4, lines 23-31, please amend to read "The device of claim 1, wherein said measurement unit comprises at least one transmitter and one receiver of a wave suitable for propagating between said pen and said benchmark or a relay marker, either said transmitter or said receiver being lodged in said pen while the other is lodged in said benchmark or relay marker, and a determinator for determining the position of the printing head relative to the benchmark or relay marker from the wave propagation time between the transmitter and the receiver."

Signed and Sealed this
Sixteenth Day of September, 2014

Michelle K. Lee
*Deputy Director of the United States Patent and Trademark Office*